United States Patent
He et al.

(10) Patent No.: US 10,070,478 B2
(45) Date of Patent: Sep. 4, 2018

(54) DEVICES AND METHODS FOR EPDCCH MONITORING IN WIRELESS COMMUNICATION SYSTEMS

(71) Applicant: Intel IP Corporation, Santa Clara, CA (US)

(72) Inventors: Hong He, Beijing (CN); Seunghee Han, San Jose, CA (US); Jong-Kae Fwu, Sunnyvale, CA (US); Hwan-Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/748,802

(22) Filed: Jun. 24, 2015

(65) Prior Publication Data

US 2016/0219557 A1 Jul. 28, 2016

Related U.S. Application Data

(60) Provisional application No. 62/106,473, filed on Jan. 22, 2015.

(51) Int. Cl.
*H04W 76/28* (2018.01)
*H04L 5/00* (2006.01)
(Continued)

(52) U.S. Cl.
CPC .......... *H04W 76/28* (2018.02); *H04L 5/0053* (2013.01); *H04L 5/0091* (2013.01);
(Continued)

(58) Field of Classification Search
None
See application file for complete search history.

(56) References Cited

U.S. PATENT DOCUMENTS

2015/0189574 A1* 7/2015 Ng .................. H04W 24/08
                                                      370/252
2016/0081111 A1* 3/2016 Yi .................... H04L 5/001
                                                      370/280
2016/0234706 A1* 8/2016 Liu ................. H04L 27/2662

FOREIGN PATENT DOCUMENTS

| WO | WO-2014171683 A1 | 10/2014 |
| WO | WO-2014172306 A2 | 10/2014 |
| WO | WO-2016118241 A1 | 7/2016 |

OTHER PUBLICATIONS

"Further analysis on the required functionalities for LAA", Huawei, Hisilicon, RI-144590, 3GPP TSG RAN WG1 Meeting #79, San Francisco, USA, (Nov. 8, 2014), 3 pgs.

(Continued)

*Primary Examiner* — Mohammad S Adhami
(74) *Attorney, Agent, or Firm* — Schwegman Lundberg & Woessner, P.A.

(57) ABSTRACT

Devices and methods of reducing blind decoding attempts of user equipment (UE) suing carrier aggregation are generally described. The UE may determine at least one subframe in a modification period to monitor for a physical downlink control channel (PDCCH) formed in accordance with a Discontinuous Transmission Downlink Control Information (DTX DCI) format. The DTX DCI format may indicate whether the serving cell is in a DTX or non-DTX state. The UE may determine the DTX state of each serving cell from the DTX DCI format and monitor an enhanced PDCCH of each serving cell in the non-DTX state to provide a scheduling assignment for the UE, without monitoring each serving cell in the DTX state. The UE may receive higher layer signaling that indicates a repetition period and subframe offset for DTX DCI format transmissions or a bitmap of the DTX DCI format transmissions for subframes within each modification period.

26 Claims, 7 Drawing Sheets

(51) Int. Cl.
*H04W 52/02* (2009.01)
*H04W 76/15* (2018.01)

(52) U.S. Cl.
CPC ......... *H04W 52/0216* (2013.01); *H04L 5/001* (2013.01); *H04W 76/15* (2018.02)

(56) References Cited

OTHER PUBLICATIONS

"International Application Serial No. PCT/US2015/064497, International Search Report dated Jun. 3, 2016", 5 pgs.

"International Application Serial No. PCT/US2015/064497, Written Opinion dated Jun. 3, 2016", 13 pgs.

"The on/off state indication of SCell in LAA unlicensed carrier for DL measurement", ITL Inc, RI—145110, 3GPP TSG RAN WG1 Meeting #79, San Francisco, USA, (Nov. 9, 2014), 2 pgs.

CATT, "Discontinuous transmission on Scell for LAA", RI—144626, 3GPP TSG RAN WG1 Meeting #79, San Francisco, USA., (Nov. 8, 2014), 3 pgs.

\* cited by examiner

DEVICES AND METHODS FOR EPDCCH MONITORING IN WIRELESS COMMUNICATION SYSTEMS

PRIORITY CLAIM

This application claims the benefit of priority to U.S. Provisional Patent Application Ser. No. 62/106,473, filed Jan. 22, 2015, and entitled "A NOVEL METHOD FOR (E)PDCCH MONITORING IN WIRELESS COMMUNICATION SYSTEM," which is incorporated herein by reference in its entirety.

TECHNICAL FIELD

Embodiments pertain to radio access networks. Some embodiments relate to EPDCCH monitoring in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

With the ever increasing desire for faster data rates, notably through long-term evolution-Advanced (LTE-A) networks in Release 10, system designers have turned several different techniques such as multiple input multiple output (MIMO), cooperative multiple point transmission (CoMP) and carrier aggregation. Carrier aggregation increases bandwidth, and thus bitrate, by aggregating multiple carriers to form a larger overall transmission bandwidth. Carrier aggregation, until recently, has been limited by 3GPP specification to aggregating five carriers. The number of carriers able to be aggregated has increased to thirty two in 3GPP Release 13 to effect enhanced carrier aggregation. However, the increase in the number of carriers concomitantly linearly increases the number of blind decoding attempts of the user equipment (UE) (all possible combination of physical downlink control channel (PDCCH) and enhanced PDCCH (EPDCCH) locations and formats, and DCI formats) to decode control information transmitted by the enhanced Node-B (eNB). Moreover, one solution to the explosive increase in mobile data consumption has been to deploy LTE in the unlicensed spectrum (LTE-Unlicensed (LTE-U), with UEs using the LTE-U band referred to as License Assisted Access (LAA) UEs). Unfortunately, carrier use on the unlicensed spectrum is opportunistic due to coexistence with and use of other deployed wireless devices, such as WiFi and Bluetooth, on the unlicensed spectrum. The opportunistic nature of the unlicensed spectrum may limit transmission and reception of the control (and corresponding data) signals on the unlicensed spectrum, thereby reducing the bitrate. The increase in the number of carriers, as well as the bands in which the carriers reside, may result in a significant increase in blind decoding attempts, which causes a decrease in the bitrate as well as an increase in the complexity and power consumption of the UE.

It would be therefore desirable to enable enhanced carrier aggregation for UEs without decreasing the bitrate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
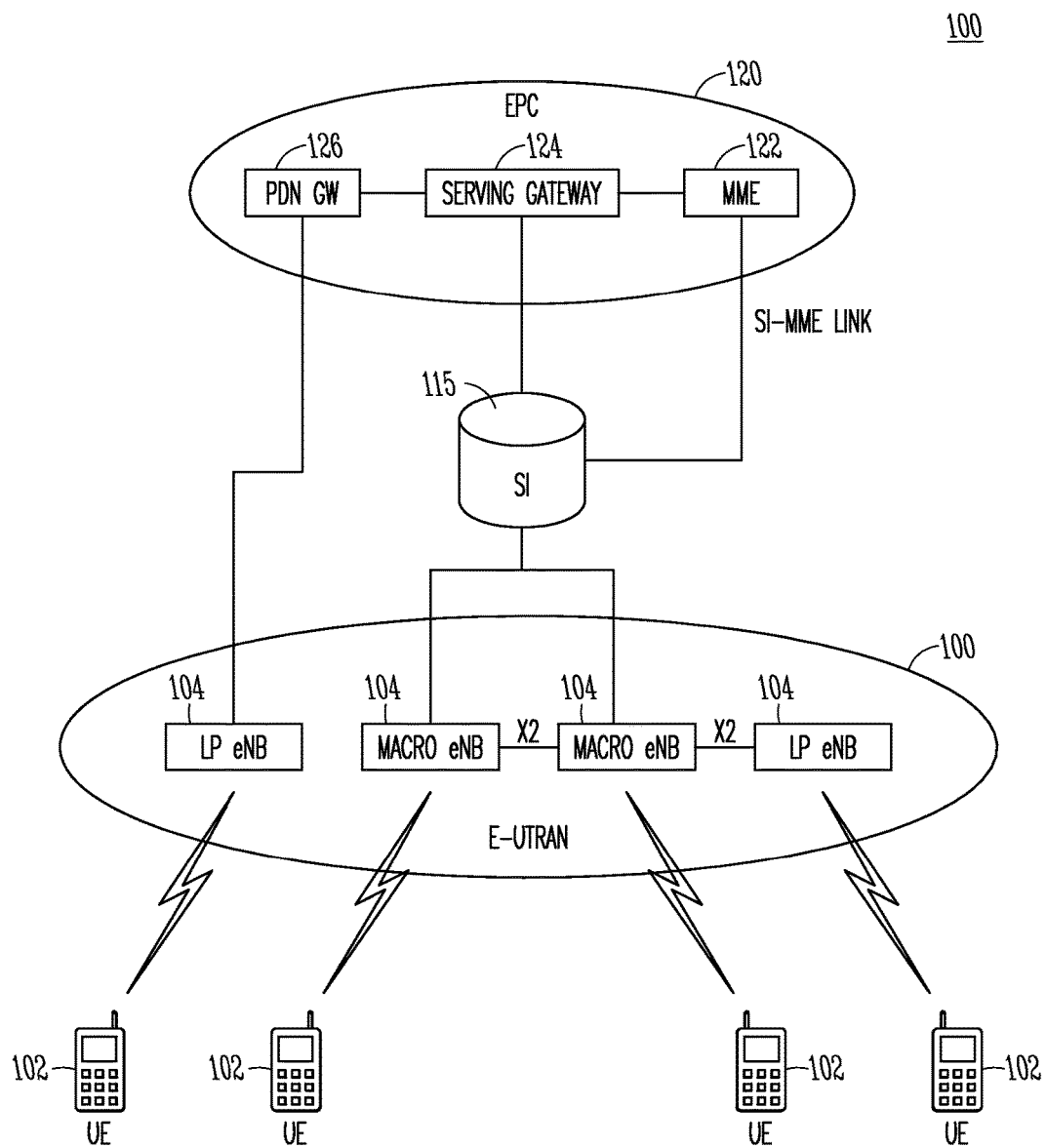
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include eNBs 104 (which may operate as base stations) for communicating with UE 102. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink communications from the UE to the eNB or downlink communications from the eNB to the UE. In one embodiment, the eNB may allocate a greater number of downlink communications than uplink communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE.

The PDCCH may contain downlink control information (DCI) in one of a number of formats that tells the UE how to find and decode data, transmitted on PDSCH in the same subframe, from the resource grid. The DCI may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE. The PDCCH may be located in any of a number of frequency/temporal regions, depending on whether the PDCCH is UE-Specific or common, as well as the aggregation level. The set of possible locations for PDCCH is called the search space. The search space indicates the set of Control Channel Element (CCE) locations where the UE may find its PDCCHs. A common search space may carry DCIs that are common for all UEs; for example, system information (using the SI-RNTI), paging (P-RNTI), PRACH responses (RA-RNTI), or UL TPC commands (TPC-PUCCH/PUSCH-RNTI). A UE-specific search space may carry DCIs for UE-specific allocations using a control RNTI (C-RNTI) assigned to the UE, a semi-persistent scheduling (SPS C-RNTI), or an initial allocation (temporary C-RNTI). As the UE may not know the exact DCI format, nor the location in time and frequency where the PUCCH may be transmitted by the eNB, the UE may thereby rely on blind decoding attempts.

In addition to the PDCCH, an enhanced PDCCH (EPDCCH) may be used by the eNB and UE. Different UEs may have different EPDCCH configurations. The EPDCCH may be configured, for example, via Radio Resource Control (RRC) signaling. Each UE may be configured with sets of EPDCCHs, and the configuration can also be different between the sets. Each EPDCCH set may have 2, 4, or 8 PRB pairs. As the EPDCCH is UE specific, only UE-specific search space may be used for EPDCCHs. Thus, DCI formats 3/3A and 1C for multiple UEs may not be supported in EPDCCHs. Instead, a special DCI format may be used to indicate which serving cells among the configured activation serving cells UE needs to perform PDCCH and/or EPDCCH monitoring with blind decoding attempts to minimize UE complexity when a large number of carrier frequencies are configured for a given UE by means of carrier aggregation. In some embodiments, resource blocks configured for EPDCCHs in a particular subframe may be used for PDSCH transmission if the resource blocks are not used for the EPDCCH transmissions during the subframe.

Figure 2:
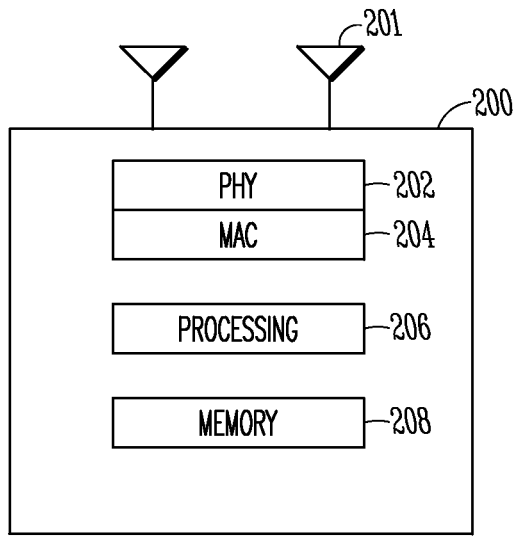
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations. In some embodiments, the physical layer (PHY) circuitry 202 may contain a transceiver connected with and controlled by the processing circuitry 206.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to 1/10 of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

As described above, the use of a greater number of carriers in carrier aggregation and, notably using carriers in the unlicensed spectrum, may increase both the number of blind decoding attempts as well as the time used by the UE to decode the DCIs. To combat this, a new DCI format, hereinafter referred to as a discontinuous transmission (DTX) DCI format, may be used to dynamically and quickly indicate whether configured serving cells are in a discontinuous transmission (DTX) state to determine an PDCCH or EPDCCH or PDSCH transmission state (whether or not an EPDCCH and PDSCH is to be transmitted) and thus whether PDCCH and/or EPDCCH monitoring is desirable. When a serving cell is in the DTX state, the serving cell may be in sleep mode and not transmitting. The UE may monitor subframes containing a PDCCH formed using the new DTX DCI format. When the UE is not idle and is in the RRC_CONNECTED state, the UE may monitor a limited set of PDCCH and/or EPDCCH candidates of one or more serving cells that are not in a DTX state (or are in a non-DTX state) according to the received new DCI format. In some embodiments, the UE may not monitor the PDCCHs of activation serving cells that are in the DTX state, thereby limiting the PDCCH and EPDCCHs that UE is to monitor for scheduling assignment/grants to down-selected serving cells not in the DTX state and concomitantly reducing the UE complexity in the number of blind detection attempts.

The DTX DCI format may indicate the activated serving cells not in the DTX state. The number of information bits in the DTX DCI format may be equal to that for Rel-12 DCI format 1C or DCI format 0 (e.g. 9 and 13 bits respectively for a bandwidth of 20 MHz) as defined in 3GPP TS 36.212. Format 1C may be used to schedule a PDSCH codeword for either single-input-single-output (SISO) or MIMO applications, while format 0 may be used to schedule uplink data on a PUSCH. The DCI formats, whether used for uplink or downlink, may each include a plurality of fields. The fields may include the resource allocation header, resource block assignment, modulation and coding scheme, HARQ process number, new data indicator, redundancy version, transmit power control (TPC) command, and downlink assignment index (DAI). The resource allocation header may indicate the type of resource allocation used for PDSCH/PUSCH resource mapping. There may be two bit map-based resource allocation types (type0 and type1), where each bit addresses a single or group of resource blocks. The resource block assignment may be used by the UE to interpret the resource allocation of PDSCH on type0 or type1 allocation. The resource block assignment may include the number of resource allocation bits and, depending on the allocation type and bandwidth, other information used for allocation and indication. The modulation and coding scheme field may indicate the coding rate and the modulation scheme used to encode the PDSCH codeword. The modulation schemes currently supported may be QPSK, 16QAM & 64QAM. The HARQ process number field may indicate the HARQ process number used by the higher layers for the current PDSCH codeword. The HARQ process number may be associated with the New Data Indicator and Redundancy Version field. The new data indicator may indicate whether the codeword is a new transmission or a re-transmission. The redundancy version may indicate the redundancy version of the codeword, which may specify the amount of redundancy, of 4 different versions corresponding to new transmission, added into the codeword while turbo encoding. The TPC command may specify the power for the UE to use in transmitting a PUCCH. The DAI is a TDD-specific field that may indicate the counts of downlink assignments scheduled for the UE within a subframe.

The information transmitted through the use of the DTX DCI format may include a DTX configuration indication. The DTX configuration may be a number from 1 to I, where I may be the total number of DTX configuration number fields within a given new DCI format. In embodiments in which the DTX configuration is 1 bit, I=L, where L may be equal to the payload size of DCI format 1C or DCI format 0 to avoid increasing the number of blind decoding attempts due to introducing the DTX DCI format. Thus, the DTX DCI format may comprise at least one fixed and independent 1-bit field to indicate the DTX state for one or multiple serving cells with one-to-one mapping respectively.

Figure 3:
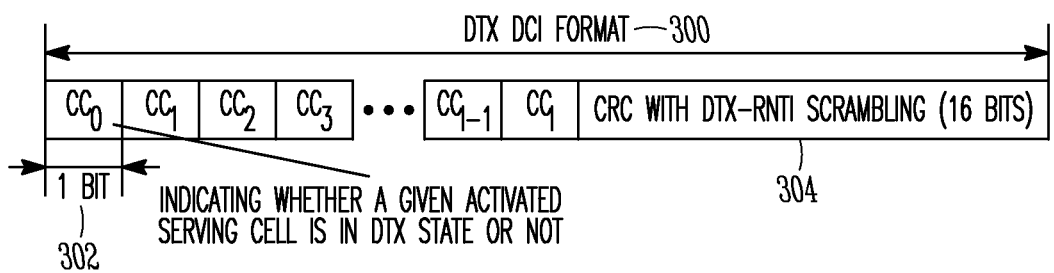
FIG. 3 shows an example of a Discontinuous Transmission (DTX) DCI format in accordance with some embodiments.

FIG. 3 shows an example of the DTX DCI format in accordance with some embodiments. In FIG. 3, each bit 302 (associated with a particular control channel (CC)) in the DTX DCI format 300 may contain information of the DTX configuration of a different serving cell. A parameter DTX-SCellIndex, which may determine the index to the DTX configuration indication for a serving cell (i.e., which bit 302 in the DTX DCI format 300 indicates which serving cell), may be provided through higher layer signaling. In some embodiments, value 1 may indicate that the particular serving cell indicated by the bit is in a DTX state and value 0 may indicate that the serving cell is not in a DTX state, while in other embodiments value 0 may indicate that the particular serving cell indicated by the bit is in a DTX state and value 1 may indicate that the serving cell is not in a DTX state. The DTX DCI format 300 may be identified by a DTX-RNTI, which is implicitly encoded in the CRC 304 of the DTX DCI format 300. The DTX-RNTI may be different than any other RNTI and may be used to specifically indicate the DTX DCI format. As the number of bits used in the DTX DCI format 300 depends on the number of serving cells, the number of bits may be less than that used in DCI format 1C or 0. To maintain consistency with these formats, in the event that the number of bits may be less than that used in DCI format 1C or 0, padding bits such as 0s may be provided in locations of the DTX DCI format 300 that would otherwise be unused until the size of the DTX DCI format 300 is equal to that of the DCI format 1C or 0.

In some embodiments, the UE may be configured by higher layer signaling to decode the PDCCH having a CRC scrambled using the DTX-RNTI. In some embodiments, the PDCCH may be transmitted using the Common Search Space (CSS) to inform the UE of the downlink subframes to measure a reference signal (e.g., Channel State Information (CSI)). Although this may be preferable from a resource efficiency standpoint, the PDCCH CSS is used to provide a number of other signals, such as System Information Blocks (SIBs), paging messages, and Random Access Channel (RACH) response signaling, as well as being a backup for dedicated resource assignment. Thus, although the PDCCH may be transmitted on the CSS, the CSS may be over congested, especially if carriers in the unlicensed spectrum are used. To overcome potential difficulties in using the CSS, in some embodiments, a new UE-group-common search space may be used rather than the CSS.

In some embodiments, the initialization of $Y_{p,-1}$ for the UE-group-common search space may be determined by the DTX-RNTI rather than by the cell RNTI (C-RNTI) of the UE. For each serving cell on which the PDCCH is monitored, the Control Channel Elements (CCEs) corresponding to PDCCH candidate m of the UE-group-common search space $S_k^{(L)}$ may be given by:

$$L\{(Y_k+m) \bmod \lfloor N_{CCE,k}/L \rfloor\}+i$$

Where $Y_k$ is defined below, $i=0, \ldots, L-1$.

$$Y_k=(A \cdot Y_{k-1}) \bmod D$$

Where $Y_{-1}=n_{RNTI}=\text{DTX-RNTI} \neq 0$, A=39827, D=65537 and $k=\lfloor n_s/2 \rfloor$, $n_s$ is the slot number within a radio frame, $m=0, \ldots, M^{(L)}-1$. $M^{(L)}$ is the number of PDCCH candidates to monitor in the given search space.

When the UE is configured with EPDCCH monitoring, one EPDCCH-PRB-set may be configured to be shared by all UEs that are configured with EPDCCH monitoring. For a common EPDCCH-PRB-set used for DCI format X transmission, having a set of ECCEs numbered from 0 to $N_{ECCE,p,k}-1$, the ECCEs corresponding to EPDCCH candidate m of the search space $ES_k^{(L)}$ may be given by:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i$$

Where $Y_{p,k}$ is defined below, $$Y_{p,k}=(A \cdot Y_{p,k-1}) \bmod D$$

Where $Y_{-1}=n_{RNTI}=\text{DTX-RNTI} \neq 0$, A=39827, $A_1$=39829, D=65537 and $k=\lfloor n_s/2 \rfloor$, $n_s$ is the slot number within a radio frame. In some embodiments, $b=n_{CI}$ if the UE is configured with a carrier indicator field for the serving cell on which the EPDCCH is monitored, otherwise b=0, where $n_{CI}$ is the carrier indicator field value. $m=0, 1, \ldots M_p^{(L)}-1$, and $M_p^{(L)}$ is the number of EPDCCH candidates to monitor at aggregation level L in the EPDCCH-PRB-set. The aggregation level L may take values of 1, 2, 4, 8, 16, or 32, for example.

In some embodiments, the subframes in which the UE that is monitoring the PDCCH whose CRC is scrambled using the DTX-RNTI may be located in a configurable serving cell. If UE detects the DTX DCI format in subframe m, value 0 (or 1) may indicate that the corresponding activated serving cell is in a DTX state for a corresponding modification period and value 1 (or 0) may indicate that the corresponding activated serving cell is not in a DTX state for the corresponding modification period. Within a modification period, the same DTX configuration indication information may be transmitted a predetermined number of times. The predetermined number of times may, in some embodiments, be based on a predetermined repetition period or configured by higher layer signaling. The modification period may be selected from a set of predefined values, e.g. 5, 10 or 20 ms or 5, 10 or 20 subframes, although these values are merely exemplary.

The DTX DCI format transmission instances for a large number of serving cells may be defined with a plurality of configurable parameters. These parameters may include periodicity T and subframe offset Δ. More specially, the periodicity T of the DTX DCI transmission may be selected from the set of predefined values (e.g. 5, 10 or 20 ms) or subframes. The DTX DCI format transmission may occur in subframes satisfying: $(10 n_f + \lfloor n_s/2 \rfloor - \Delta) \bmod T = 0$. The configurations may be semi-statically configured via a system information (e.g., SIB, MIB) message.

Figure 4A:
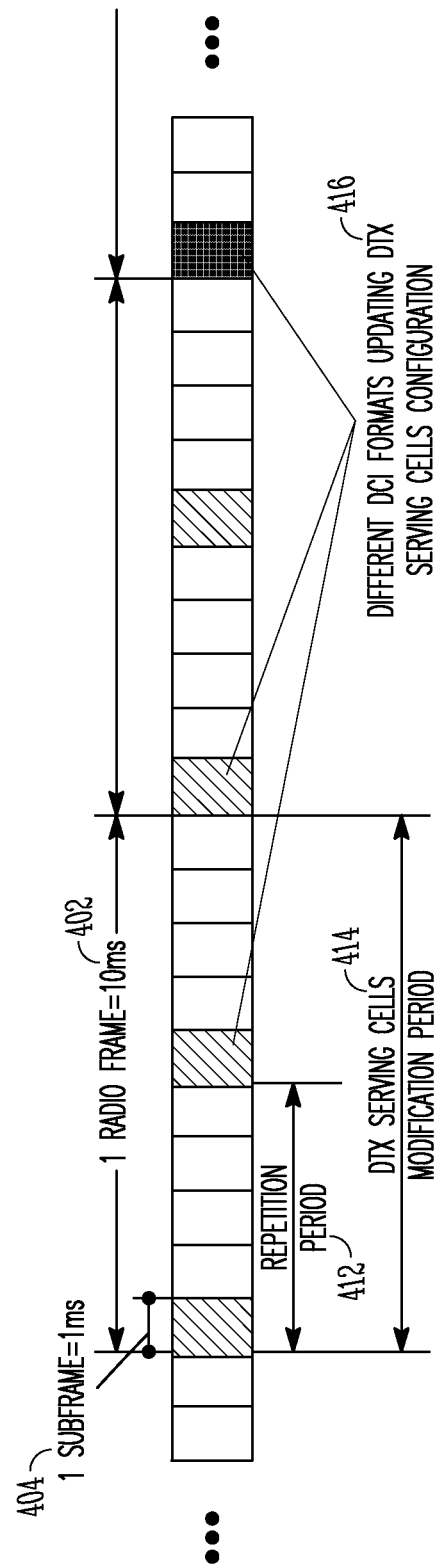
FIGS. 4A and 4B illustrate examples of a DTX DCI format transmission in accordance with some embodiments.
Figure 4B:
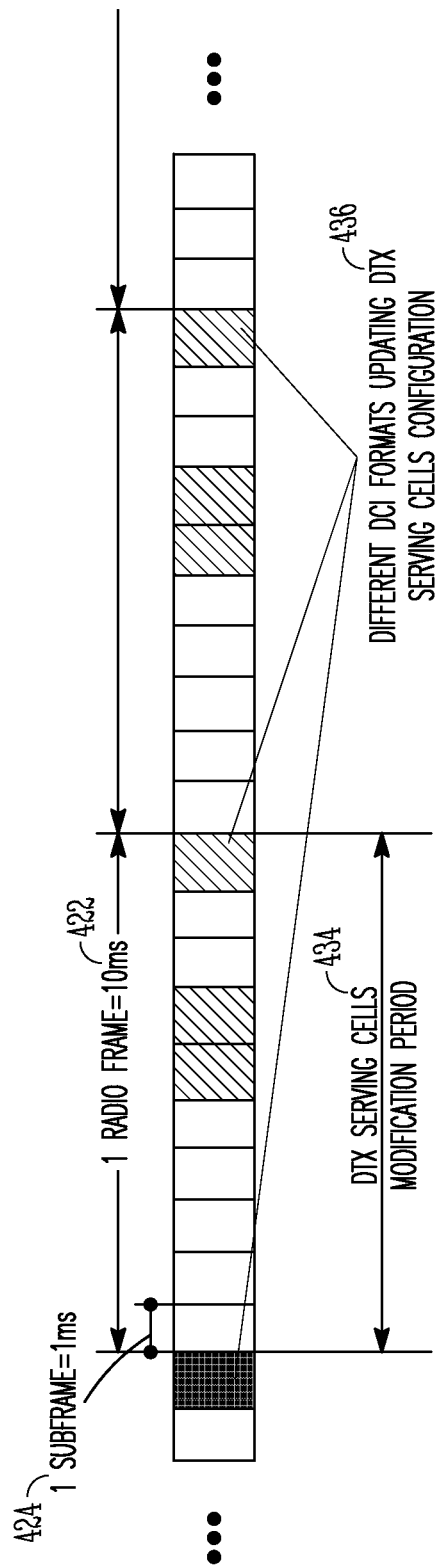

FIGS. 4A and 4B illustrate examples of a DTX DCI format transmission in accordance with some embodiments. FIG. 4A shows several 10 ms radio frames 402 in which 10 1 ms subframes 404 are disposed. As shown, the modification period 414 is one radio frame, or 10 ms, the repetition period 412 is one slot, or 5 ms and the subframe offset is 0. Thus, two repetitions of the DTX DCI format 416 are transmitted in each modification period 414. In other embodiments, the modification period 414, the repetition period 412 and the subframe offset may be different. In some embodiments, the modification period 414, the repetition period 412 and the subframe offset may be the same or may vary between modification periods. Different DTX DCI formats 416 in the different modification periods 414 may indicate different DTX serving cells configuration information (i.e., which serving cells are in a DTX state).

In some embodiments, the subframes in which the UE (monitoring the PDCCH with the DTX-RNTI CRC) may be configured by bitmap-based RRC signaling RRC as shown in FIG. 4B. Similar to FIG. 4A, FIG. 4B shows several 10 ms radio frames 422 in which 10 1 ms subframes 424 are disposed. As shown, the modification period 424 is one radio frame, or 10 ms. Unlike FIG. 4A, however, in FIG. 4B there is no repetition period for the DTX DCI format transmission. Instead, subframes 436 with the same DTX serving cells configuration information may be indicated through higher layer signaling using an X-bit bitmap method, in which X is the number of subframes in the modification period. Thus, in the example shown in FIG. 4B, the modification period 424 is 10 subframes (e.g. X=10) and the bitmap for the 10 subframes may be transmitted as "0000011001" indicating that the $6^{th}$, $7^{th}$ and $10^{th}$ subframe contain DTX serving cells configuration information. In some embodiments, the bitmap may indicate that the DTX DCI format is provided in a last subframe in each modification period.

Figure 5:
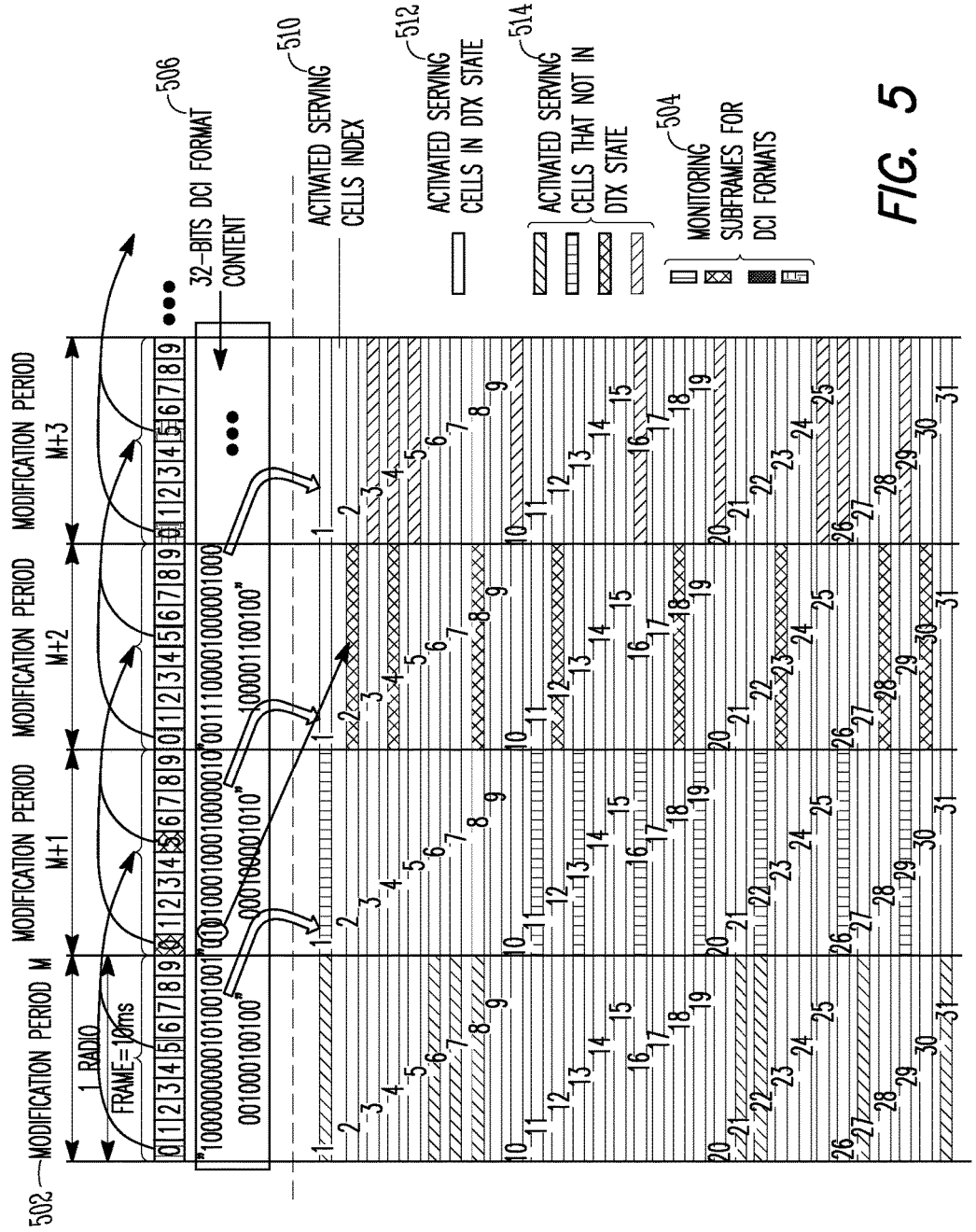
FIG. 5 illustrates an example of DTX DCI format use over several modification periods in accordance with some embodiments.

FIG. 5 illustrates an example of DTX DCI format use over several modification periods in accordance with some embodiments. In general, when the network changes the DTX serving cells configuration information, it may notify the UEs about the change via the DTX DCI format during the immediately preceding modification period 502. Thus, given a first modification period m, in the next modification period m+1 including subframes {(m+1)T+mT/10, (m+1)T+mT/10+1, (m+1)T+mT/10+2, ..., (m+1)T+mT/10+T−1}, the DTX state of serving cells in the next modification period m+1 may be given by the DTX configuration indication signaled on the DTX DCI format of first modification period m.

As shown in FIG. 5, each modification period may contain a set of monitoring subframes 504 that contain DTX DCI format content 506 in the form of a bitmap and may thus be monitored by the UE. The bitmap 506 in the monitoring subframes 504 may contain a number of bits equal to the number of activated serving cells 512, 32 in the example shown in FIG. 5. Each of the activated serving cells may be identified via a unique value of an activated serving cell index 510. The activated serving cells 512 include activated serving cells that are in the DTX state 512 and activated serving cells that are not in the DTX state 514, the latter of which may thus be monitored by the UE. Although 32 active serving cells are shown in FIG. 5 as being available for activation for a given UE, the UE may be capable of monitoring the PDCCH in up to 8 activated serving cells. In some embodiments, the activated serving cells may be deployed in the 5 GHz unlicensed spectrum. This may be useful as the activated serving cells may be opportunistically available for LTE data transmission due to the unlicensed spectrum being shared by commercial, enterprise and private Wi-Fi networks, weather radar and several other incumbents.

In FIG. 5, the UE may be configured to monitor DTX DCI format transmissions in one monitoring subframe 504 every 5 ms (i.e., as shown having a repetition period with parameters T=5 ms and Δ=0) in order to obtain updated DTX serving cells configuration information 506. As above, the modification period 502 may be configured as 10 ms by RRC signaling. The network may decide the DTX serving cells for potential LTE PDSCH transmission based on measurements by the eNB on the configured serving cells. In the example shown in FIG. 5, activated serving cells having an activated serving cell index 510 of 1, 11, 13, 16, 19, 22, 26 and 29 in modification period m+1 may not be in a DTX state and thus provide a PDSCH transmission. A DTX DCI format having content "10000000001010010010001000100100" may be sent in monitoring subframe 0 and 5 in modification period m to inform the UE about updated activated serving cells in the DTX state and not in the DTX state for EPDCCH monitoring in modification period m+1. A DTX DCI format of "01010001000100000100001000001010" may also be transmitted in monitoring subframe 0 and 5 in modification period m+1 to indicate to the UE to monitor the EPDCCH in activated serving cells 2, 4, 8, 12, 18, 23, 28 and 30 in modification period m+2 for data transmission. A DTX DCI format of "00111000000000010000000001100100" in subframe 0 and 5 in modification period m+2 may be used to inform the UE to monitor the EPDCCH in activated serving cells 3, 4, 5, 16, 25, 26 and 29 in modification period m+3 for data transmission.

Figure 6:
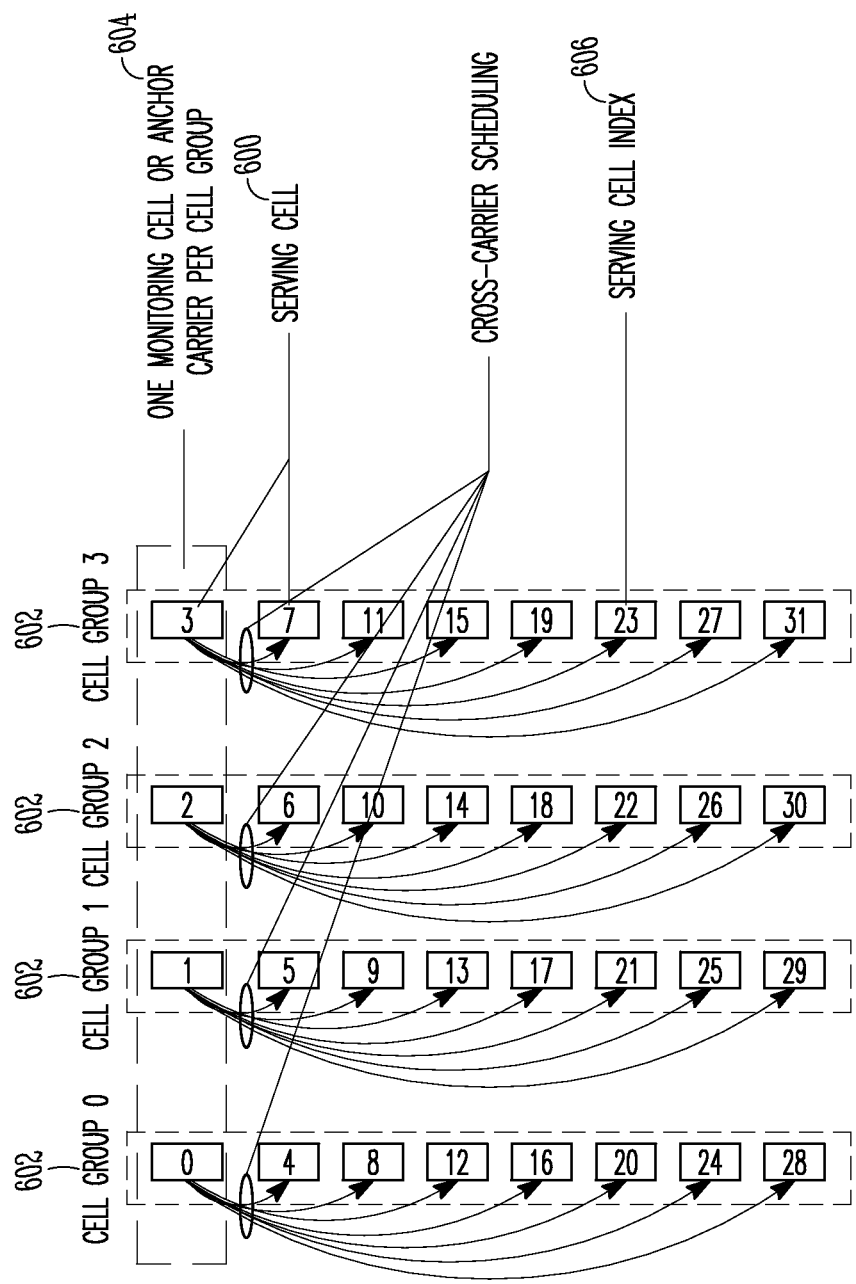
FIG. 6 illustrates an example of cell group use in accordance with some embodiments.

FIG. 6 illustrates an example of cell group use in accordance with some embodiments. As shown, monitoring (or anchor) cells 604 may be defined for EPDCCH monitoring for a set of 32 serving cells 600, in which each serving cell 600 has a different serving cell index 606. The UE may receive the grouping from a serving cell or other network entity, such as an MME, using higher layer signaling. The serving cells 600 may first be grouped into a predetermined number of cell groups 602. The cell group information (e.g., which serving cells 600 form which serving cell group 602, as well as the index of the serving cell group 602) may be provided to the UE dynamically by higher layer signaling such as RRC signaling or statically, as defined by the network in a predetermined manner. The UE may be configured with one control channel for each serving cell. Each serving cell group 602 may thus contain a different monitoring cell 604. The EPDCCH in each monitoring cell 604 may schedule the PDSCH for the monitoring cell 604 and for the other serving cells 600 within the same serving cell group 602, thereby providing cross-carrier scheduling. In the example shown in FIG. 6, the serving cell 600 with lowest index in each serving cell group 602 may autonomously act as the monitoring cell 604 for EPDCCH monitoring. A UE may thus monitor the EPDCCH in only the monitoring cells 604 (e.g., serving cell 0, 1, 2 and 3) to obtain PDSCH transmission information of the serving cells 600 in the serving cell group 602 rather than monitoring the EPDCCH in each serving cells 600.

The DTX DCI format may be introduced such that a single PDCCH from a monitoring cell 604 is able to schedule multiple PDSCHs for the different serving cells 600 in the associated cell group 602 together. In some embodiment, the DTX DCI format may be able to achieve this by reusing the 3-bit Carrier Indicator Field (CIF), which indicates on which carrier a scheduled resource is located, thereby retaining the same level of blind decoding attempts as in current LTE system. As can be seen in FIG. 5, in cell group 0, serving cell index {0, 4, 8, 12, 16, 20, 24, 28} can be logically mapped to 3-bit CIF {0, 1, 2, 3, 4, 5, 6, 7}. The CIF field in a detected EPDCCH may be used to indicate in which serving cell 604 within a particular serving cell group 602 to decode the PDSCH. The DTX DCI format may include a control channel group index to choose a subset of the control channels for EPDCCH monitoring.

In some embodiments, serving cell indexes 0 to 4 can be designated as monitoring cells and the monitoring cells can schedule PDSCHs for other non-monitoring cells (possibly with a single PDCCH from each monitoring cell). One example of the linkage between monitoring cells and non-monitoring cells is shown in Table 1 assuming a carrier aggregation of up to 32 control channels. In Table 1, all the control channels are activated and split into 5 groups (group A-E). The serving cell with the serving cell index 0 may be the primary cell (PCell). The PCell may be the serving cell in which the UE either performs an initial connection establishment procedure or initiates connection re-establishment procedure. The secondary cell (SCell) may be the serving cell configured once an RRC connection is established between the UE and the PCell and that may be used to provide additional radio resources. The monitoring cell for each group may be the first serving cell of the group, with each group being associated with a different monitoring cell of the first 5 serving cells (serving cell index 0-4). The serving cells may then be associated with groups in increasing order such that every 5 serving cells in index resets to the same group. In other embodiments, the serving cells may be distributed non-uniformly (e.g., the monitoring cells may not be associated with the same number of serving cells) and/or non-incrementally (e.g., serving cells with a serving cell index incremented by one may not be in the next incremented group). If a scheduled serving cell as per each group is not activated, the PDSCH may not be scheduled for the scheduled serving cell. The relationship between monitoring cell and the scheduled cell(s) can be configured by higher layer signaling such as by RRC signaling.

TABLE 1 monitoring cell example

| | Monitoring cell (as denoted as serving cell index) | Scheduled serving cells by monitoring cell |
|---|---|---|
| Group A | 0 (possibly primary cell PCell) | 0, 5, 10, 15, 20, 25, 30 |
| Group B | 1 | 1, 6, 11, 16, 21, 26, 31 |
| Group C | 2 | 2, 7, 12, 17, 22, 27 |
| Group D | 3 | 3, 8, 13, 18, 23, 28 |
| Group E | 4 | 4, 9, 14, 19, 24, 29 |

Table 2 provides another example in which serving cell indexes 0 to 8 may be designated as monitoring cells, and the monitoring cells can schedule PDSCHs for other non-monitoring cells. A carrier aggregation of up to 32 control channels is again assumed, and all the control channels are activated and split evenly into 8 groups (group A-H) in Table 2. The monitoring cell for each group may be the first serving cell of the group, with each group being associated with a different monitoring cell of the first 8 serving cells (serving cell index 0-7). The serving cells may then be associated with groups in increasing order such that every 8 serving cells in index resets to the same group. As above, in other embodiments, the serving cells may be distributed non-uniformly (e.g., the monitoring cells may not be associated with the same number of serving cells) and/or non-incrementally (e.g., serving cells with a serving cell index incremented by one may not be in the next incremented group). If a scheduled serving cell as per each group is not activated, the PDSCH may not be scheduled for the scheduled serving cell.

TABLE 2 monitoring cell example

| | Monitoring cell (as denoted as serving cell index) | Scheduled serving cells by monitoring cell |
|---|---|---|
| Group A | 0 (possibly PCell) | 0, 8, 16, 24 |
| Group B | 1 | 1, 9, 17, 25 |
| Group C | 2 | 2, 10, 18, 26 |
| Group D | 3 | 3, 11, 19, 27 |
| Group E | 4 | 4, 12, 20, 28 |
| Group F | 5 | 5, 13, 21, 29 |
| Group G | 6 | 6, 14, 22, 30 |
| Group H | 7 | 7, 15, 23, 31 |

The relationship between monitoring cell and the scheduled cell(s) can be configured by higher layer signaling, providing a one-to-multiple mapping between the monitoring cell and scheduled cell.

Examples of parameters for the PCell and SCell:

```
<For PCell>
PhysicalConfigDedicated ::=    SEQUENCE {
[...]
NonmonitoringCellList   SEQUENCE (SIZE (1..maxSCell)) OF
                            SCellIndex
}
<For SCell>
SCellToAddMod ::=         SEQUENCE {
    sCellIndex                SCellIndex,
    cellIdentification        SEQUENCE {
        physCellId                PhysCellId,
        dl-CarrierFreq            ARFCN-ValueEUTRA
[...]
    NonmonitoringCellList   SEQUENCE (SIZE (1..maxSCell)) OF
                                SCellIndex
    }
SCellIndex ::=                       INTEGER (1..31)
```

The existence of the parameter NonmonitoringCell of a serving cell (not shown above) means the cell is designated as monitoring cell (if not, it is not monitoring cell). As a further detail, PCell can only be designated as monitoring cell (i.e. it cannot be non-monitoring cell).

Figure 7:
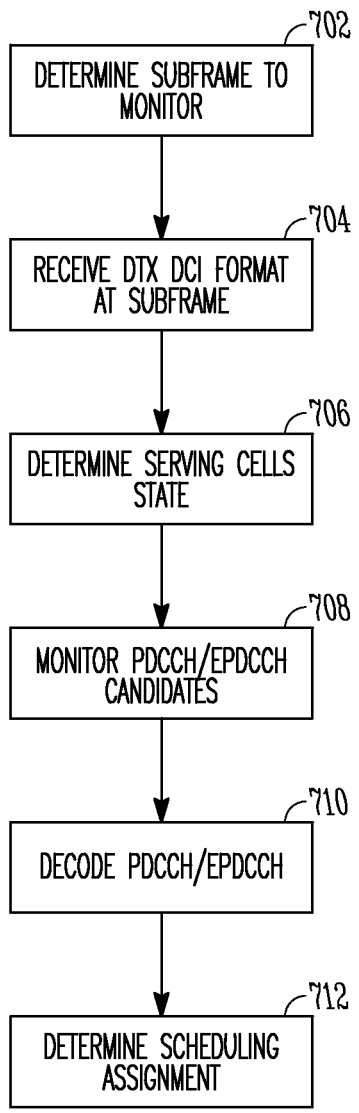
FIG. 7 illustrates a flowchart for determining a scheduling assignment in accordance with some embodiments.

FIG. 7 illustrates a flowchart for determining a scheduling assignment in accordance with some embodiments. The method may be performed by a UE, such as UE 102 (FIG. 1) or 200 (FIG. 2), in which carrier aggregation is used. In some embodiments, the carrier aggregated channels may include subcarriers in the LTE unlicensed band. At operation 702, the UE may determine one or more subframes within a particular frame to monitor for a DCI format. The subframes may be repeated within a modification period, and have a periodicity and subframe offset within the modification period. The subframe information, including the modification period, periodicity and subframe offset may be provided to the UE via higher layer signaling. In some embodiments, the subframes may be determined within the modification period via a bitmap provided to the UE via higher layer signaling. The higher layer signaling may be provided to the UE when the UE is not idle and is in the RRC_CONNECTED state.

At operation 704, the UE may receive a DTX DCI format at the subframe indicated in operation 702. The DTX DCI format may contain information of the DTX configuration of one or more serving cells, identified based on an index provided to the UE via higher layer signaling. Each serving cell may be associated with any number of bits and may be identified using an index. The information provided to the UE in a particular modification period may be for the next modification period. The CRC of the DTX DCI format scrambled using a DTX-RNTI, thereby permitting the UE to decode the DTX DCI format.

The DTX DCI format information may contain data for each serving cell. This data may be used by the UE at operation 706 to determine the DTX state of each of the serving cells. The serving cells may be in the DTX state or in a non-DTX state. In some embodiments, a single EPDCCH may be able to schedule multiple PDSCHs for different serving cells in a cell group associated with the EPDCCH.

In response to the UE determining that a particular serving cell is in a DTX state, the UE may determine that no monitoring of that serving cell is desired. In response to the UE determining that the DTX state a particular serving cell is in is a non-DTX state, at operation 708 the UE may monitor the particular serving cell for a PDCCH and/or an EPDCCH.

At operation 710, the UE detects a PDCCH or an EPDCCH from the serving cell and decodes the PDSCH. The EPDCCH may be transmitted using a UE-group-common search space. The UE may monitor for the PDCCH and/or EPDCCH when the UE is not idle and is in the RRC_CONNECTED state. The UE may monitor only PDCCH and/or EPDCCH candidates of one or more serving cells that are not in the DTX state as indicated by the DCI format.

The UE, having received the PDCCH and/or EPDCCH, may then determine an uplink scheduling assignment for the serving cell at operation 712. The UE may use the uplink scheduling assignment to transmit measurement of a reference signal on the PUCCH and/or transmit data.

Various examples of the disclosure are provided below. These examples are not intended to in any way limit the disclosure herein. In Example 1, a UE comprises a transceiver configured to transmit and receive signals from a plurality of serving cells; and processing circuitry configured to: determine at least one subframe to monitor for a physical downlink control channel (PDCCH) formed in accordance with a first Downlink Control Information (DCI) format, the first DCI format indicating a transmission state of the serving cells; configure the transceiver to receive the at least one subframe containing the first DCI format; determine the transmission state of the serving cells based on the received first DCI format; and configure the transceiver to monitor at least one of the PDCCH and an enhanced PDCCH (EPDCCH) of the serving cells determined to be in a first transmission state and refrain from monitoring the at least one of the PDCCH and EPDCCH of serving cells determined from the first DCI format to be in a second transmission state, the at least one of the PDCCH and EPDCCH of serving cells to be in the first transmission state configured to provide a scheduling assignments for the UE.

In Example 2, the subject matter of Example 1 can optionally include that the first DCI format is periodically transmitted in at least one subframe of each modification period, the transmission state of the serving cells indicated by the first DCI format transmitted in the at least one subframe of each modification period independent of that of the serving cells indicated by the first DCI format transmitted in the at least one subframe of each other modification period, and the processing circuitry is further configured to configure the transceiver to receive higher layer signaling specifying the at least one subframe in which the UE monitors the first DCI format.

In Example 3, the subject matter of one or any combination of Examples 1-2 can optionally include the processing circuitry is further configured to: configure the transceiver to receive higher layer signaling that indicates a repetition period and subframe offset of the at least one of the PDCCH and EPDCCH formed in accordance with the first DCI format within each modification period such that the at least one subframe comprises a plurality of subframes within each modification period.

In Example 4, the subject matter of one or any combination of Examples 1-3 can optionally include that the transmission state of the serving cells indicated by the first DCI format in a plurality of subframes within each modification period is the same.

In Example 5, the subject matter of one or any combination of Examples 1-4 can optionally include that the higher layer signaling comprises a broadcasted system information message.

In Example 6, the subject matter of one or any combination of Examples 1-5 can optionally include that the higher layer signaling comprises a UE-specific Radio Resource Control (RRC) message to indicate by a bitmap at least one subframe within each modification period for the first DCI format transmission.

In Example 7, the subject matter of one or any combination of Examples 1-6 can optionally include that the first DCI format includes cyclic redundancy code (CRC) bits scrambled by a Discontinuous Transmission Radio Network Temporary Identifier (DTX-RNTI) that specifically used to differentiate between the first DCI format and other DCI formats that have the same size.

In Example 8, the subject matter of one or any combination of Examples 1-7 can optionally include the processing circuitry is further configured to: configure the transceiver to receive the PDCCH formed in accordance with the first DCI format on a common search space (CSS) of a PDCCH on a particular serving cell.

In Example 9, the subject matter of one or any combination of Examples 1-8 can optionally include that the processing circuitry is further configured to: configure the transceiver to receive the PDCCH formed in accordance with the first DCI format on a UE-group-common search space of a PDCCH on a particular serving cell associated with the DTX-RNTI.

In Example 10, the subject matter of one or any combination of Examples 1-9 can optionally include that the transmission state of the serving cells comprises a Discontinuous Transmission (DTX) state in which the corresponding serving cell does not transmit either an EPDCCH or PDCCH and a non-DTX state in which the serving cell transmits at least one of a PDCCH and EPDCCH, and the first DCI format comprises at least one 1-bit field that indicates the transmission state for each of the at least one serving cell, each of the at least one serving cell associated with a at least one 1-bit field.

In Example 11, the subject matter of one or any combination of Examples 1-10 can optionally include that the first transmission state is the non-DTX state and the second transmission state is the DTX state.

In Example 12, the subject matter of one or any combination of Examples 1-11 can optionally include that value 0 of the received 1-bit field in the first DCI format indicates the first transmission state for the corresponding serving cell and value 1 of the received 1-bit field in the first DCI format indicates the second transmission state for the corresponding serving cell.

In Example 13, the subject matter of one or any combination of Examples 1-12 can optionally include that the processing circuitry is configured to: determine the transmission state of the serving cells at most once per modification period.

In Example 14, the subject matter of one or any combination of Examples 1-13 can optionally include that the first DCI format comprises a sufficient number of padding bits such that the first DCI format is a same size as DCI format 1C or DCI format 0.

In Example 15, the subject matter of one or any combination of Examples 1-14 can optionally include that the processing circuitry is configured to configure the transceiver to receive the at least one of the PDCCH and EPDCCH formed in accordance with the first DCI format at least once within each modification period, the first DCI format is configured to indicate the transmission state of the serving cells in a different modification period from the modification period in which the PDCCH formed in accordance with the first DCI format was received, and the processing circuitry is configured to configure the transceiver to monitor the at least one of the PDCCH and EPDCCH of the serving cells in the different modification period.

In Example 16, the subject matter of one or any combination of Examples 1-15 can optionally include that each of the serving cells is associated with an index in the first DCI format, and the processing circuitry is configured to configure the transceiver to receive higher layer signaling indicating the corresponding field index of the first DCI format for each serving cell prior to receiving the first DCI format.

In Example 17, the subject matter of one or any combination of Examples 1-16 can optionally include an antenna configured to provide communications between the transceiver and the serving cells.

In Example 18, the subject matter can include a non-transitory computer-readable storage medium that stores instructions for execution by one or more processors of user equipment (UE) to communicate with a plurality of serving cells, the one or more processors to configure the UE to: group the serving cells into cell groups; configure a monitoring cell for each cell group to monitor at least one of the PDCCH and an enhanced physical downlink control channel (EPDCCH) in the monitoring cell, the monitoring cell representing a physical downlink shared channel (PDSCH) transmission state of each serving cell in the cell group associated with the monitoring cell; and monitor the at least one of the PDCCH and EPDCCH in the monitoring cell for a PDSCH transmission.

In Example 19, the subject matter of Example 18 can optionally include instructions that configure the one or more processors to configure the UE to: receive higher layer signaling that configures grouping of the serving cells.

In Example 20, the subject matter of one or any combination of Examples 18-19 can optionally include instructions that configure the one or more processors to configure the UE to: determine a PDSCH transmission schedule in both the monitoring cell and the serving cells within the cell group associated with the monitoring cell using the EPDCCH.

In Example 21, the subject matter of one or any combination of Examples 18-20 can optionally include instructions that configure the one or more processors to configure the UE to: receive at least one of the PDCCH and EPDCCH formed in accordance with a Downlink Control Information (DCI) format that indicates a transmission state of each monitoring cell.

In Example 22, the subject matter of one or any combination of Examples 18-21 can optionally include instructions that configure the one or more processors to configure the UE to: the DCI format indicates one of a Discontinuous Transmission (DTX) state and a non-DTX state of each monitoring cell, the instructions configure the one or more processors to configure the UE to monitor the at least one of the PDCCH and EPDCCH in monitoring cells having the non-DTX state and ignore monitoring cells having the DTX state.

In Example 23, the subject matter can include an apparatus of an eNB configured to communicate with user equipment (UE), the apparatus comprising: processing circuitry configured to: configure a transceiver to transmit to the UE information regarding transmission timing of a physical downlink control channel (PDCCH) formed in accordance with a Discontinuous Transmission Downlink Control Information (DTX DCI) format, the DTX DCI format comprising a DTX indication for a plurality of states for a plurality of eNBs, the DTX indication indicating whether a corresponding eNB is in a DTX state or a non-DTX state; configure the transceiver to transmit at least one of the PDCCH and an enhanced physical downlink control channel (EPDCCH) formed in accordance with the DTX DCI format in at least one subframe in a modification period indicated by the transmission timing; and configure the transceiver to transmit at least one of the PDCCH and EPDCCH as indicated by the DTX DCI format, the at least one of the PDCCH and EPDCCH configured to provide a scheduling assignment for the UE.

In Example 24, the subject matter of Example 23 can optionally include that the first DCI format is periodically transmitted in at least one subframe of each modification period, and the processing circuitry is configured to configure the transceiver to transmit the transmission subframes using higher layer signaling, the higher layer signaling indicating a repetition period and subframe offset within each modification period or a bitmap of subframes within each modification period used for the DTX DCI format transmissions.

In Example 25, the subject matter of one or any combination of Examples 23-24 can optionally include that the DTX DCI format includes cyclic redundancy code (CRC) bits scrambled by a Discontinuous Transmission Radio Network Temporary Identifier (DTX-RNTI) that specifically indicates use of the DTX DCI format.

In Example 26, the subject matter of one or any combination of Examples 23-25 can optionally include that configure the transceiver to transmit the at least one of the PDCCH and EPDCCH formed in accordance with the DTX DCI format on one of: a common search space (CSS) on the serving cell, or a UE-group-common search space on the eNB associated with the DTX-RNTI.

In Example 27, the subject matter of one or any combination of Examples 23-26 can optionally include that the DTX DCI format comprises a sufficient number of padding bits such that the DTX DCI format is a same size as DCI format 1C or DCI format 0.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. User equipment (UE) comprising:
a transceiver configured to transmit and receive signals from a plurality of serving cells; and
processing circuitry configured to:
determine at least one subframe to monitor for a physical downlink control channel (PDCCH) formed in accordance with a first Downlink Control Information (DCI) format, the first DCI format indicating a transmission state of the serving cells;
configure the transceiver to receive the at least one subframe containing the first DCI format over a configurable modification period in which the transmission state of the serving cells indicated by the first DCI format remains constant, wherein at least one of the modification period, a configurable repetition period over which the at least one subframe is provided within the modification period or a subframe offset of the at least one subframe from an initial subframe of the modification period is able to vary between modification periods, and the at least one subframe is dependent on a frame number, a subframe number, a periodicity of the at least one subframe and the subframe offset;
determine the transmission state of the serving cells based on the received first DCI format; and
configure the transceiver to monitor at least one of the PDCCH or an enhanced PDCCH (EPDCCH) of the serving cells determined to be in a first transmission state and refrain from monitoring the at least one of the PDCCH or EPDCCH of serving cells determined from the first DCI format to be in a second transmission state, the at least one of the PDCCH or EPDCCH of serving cells to be in the first transmission state configured to provide a scheduling assignment for the UE.

2. The UE of claim 1, wherein:
the transmission state of the serving cells indicated by the first DCI format transmitted in the at least one subframe of the modification period is independent of that of the serving cells indicated by the first DCI format transmitted in the at least one subframe of another modification period, and
the processing circuitry is further configured to configure the transceiver to receive higher layer signaling specifying the at least one subframe in which the UE monitors the first DCI format.

3. The UE of claim 2, wherein the processing circuitry is further configured to:
configure the transceiver to receive higher layer signaling that indicates the configurable repetition period and subframe offset, the at least one subframe comprises a plurality of subframes within the modification period, and the at least one subframe satisfies: $(10n_f + \lfloor n_s/2 \rfloor - \Delta) \mod T = 0$, where $n_f$ is the frame number, $n_s$ is the subframe number, $T$ is the periodicity and $\Delta$ is the subframe offset.

4. The UE of claim 3, wherein the higher layer signaling comprises a broadcasted system information message.

5. The UE of claim 2, wherein:
the higher layer signaling comprises a UE-specific Radio Resource Control (RRC) message to indicate by a bitmap of at least one subframe within the modification period for the first DCI format transmission.

6. The UE of claim 1, wherein:
the first DCI format includes cyclic redundancy code (CRC) bits scrambled by a Discontinuous Transmission Radio Network Temporary Identifier (DTX-RNTI) that specifically used to differentiate between the first DCI, format and other DCI formats that have the same size.

7. The UE of claim 6, wherein the processing circuitry is further configured to:
configure the transceiver to receive the PDCCH formed in accordance with the first DCI format on a common search space (CSS) of a PDCCH on a particular serving cell.

8. The UE of claim 6, wherein the processing circuitry is further configured to:
configure the transceiver to receive the PDCCH formed in accordance with the first DCI format on a UE-group-common search space of a PDCCH on a particular serving cell associated with the DTX-RNTI.

9. The UE of claim 1, wherein:
the transmission state of the serving cells comprises a Discontinuous Transmission (DTX) state in which the corresponding serving cell does not transmit either an EPDCCH or PDCCH and a non-DTX state in which the serving cell transmits at least one of a PDCCH and EPDCCH, and the first DCI format comprises at least one 1-bit field that indicates the transmission state for each of the at least one serving cell, each of the at least one serving cell associated with a at least one 1-bit field.

10. The UE of claim 9, wherein:
the first transmission state is the non-DTX state and the second transmission state is the DTX state.

11. The UE of claim 9, wherein:
value 0 of the received 1-bit field in the first DCI format indicates the first transmission state for the corresponding serving cell and value 1 of the received 1-bit field in the first DCI format indicates the second transmission state for the corresponding serving cell.

12. The UE of claim 1, wherein the processing circuitry is configured to:
determine the transmission state of the serving cells at most once per modification period.

13. The UE of claim 1, wherein:
the first DCI format comprises a sufficient number of padding bits such that the first DCI format is a same size as DCI format 1C or DCI format 0.

14. The UE of claim 1, wherein:
the processing circuitry is configured to configure the transceiver to receive the at least one of the PDCCH or EPDCCH formed in accordance with the first DCI format at least once within the modification period,
the first DCI format is configured to indicate the transmission state of the serving cells in a different modification period from the modification period in which the PDCCH formed in accordance with the first DCI format was received, and
the processing circuitry is configured to configure the transceiver to monitor the at least one of the PDCCH or EPDCCH of the serving cells in the different modification period.

15. The UE of claim 14, wherein:
each of the serving cells is associated with an index in the first DCI format, and
the processing circuitry is configured to configure the transceiver to receive higher layer signaling indicating the corresponding field index of the first DCI format for each serving cell prior to receiving the first DCI format.

16. The UE of claim 1, further comprising:
an antenna configured to provide communications between the transceiver and the serving cells.

17. A non-transitory computer-readable storage medium that stores instructions for execution by one or more processors of user equipment (UE) to communicate with a plurality of serving cells, the one or more processors to configure the UE to:

group the serving cells into cell groups;

configure a monitoring cell for each cell group to monitor at least one of a physical downlink control channel (PDCCH) or an enhanced PDCCH (EPDCCH) in the monitoring cell, the monitoring cell representing a physical downlink shared channel (PDCCH) transmission state of each serving cell in the cell group associated with the monitoring cell over a configurable modification period in which the transmission state of the serving cells remains constant, wherein at least one of the modification period, a configurable repetition period over which the at least one of the PDCCH or EPDCCH is provided within the modification period or a subframe offset of the at least one of the PDCCH or EPDCCH from an initial subframe of the modification period is able to vary between modification periods, and the at least one subframe is dependent on a frame number, a subframe number, a periodicity of the at least one subframe and the subframe offset; and monitor the at least one of the PDCCH or EPDCCH in the monitoring cell for a PDSCH transmission.

18. The medium of claim 17, further storing instructions that configure the one or more processors to configure the UE to:

receive higher layer signaling that configures grouping of the serving cells.

19. The medium of claim 17, further storing instructions that configure the one or more processors to configure the UE to:

determine a PDSCH transmission schedule in both the monitoring cell and the serving cells within the cell group associated with the monitoring cell using the EPDCCH.

20. The medium of claim 19, further storing instructions that configure the one or more processors to configure the UE to:

receive at least one of the PDCCH and EPDCCH formed in accordance with a Downlink Control Information (DCI) format that indicates a transmission state of each monitoring cell.

21. The medium of claim 19, wherein:

the DCI format indicates one of a Discontinuous Transmission (DTX) state and a non-DTX state of each monitoring cell, the instructions configure the one or more processors to configure the UE to monitor the at least one of the PDCCH and EPDCCH in monitoring cells having the non-DTX state and ignore monitoring cells having the DTX state.

22. An apparatus of an eNB configured to communicate with user equipment (UE), the apparatus comprising:

a transceiver configured to transmit to and receive signals from UE; and processing circuitry configured to:

configure a transceiver to transmit to the UE information regarding transmission timing of a physical downlink control channel (PDCCH) formed in accordance with a Discontinuous Transmission Downlink Control Information (DTX DCI) format, the DTX DCI format comprising a DTX indication for a plurality of states for a plurality of eNBs, the DTX indication indicating whether a corresponding eNB is in a DTX state or a non-DTX state;

configure the transceiver to transmit at least one of the PDCCH or an enhanced physical downlink control channel (EPDCCH) formed in accordance with the DTX DCI format in at least one subframe in a configurable modification period indicated by the transmission timing in which the transmission state of the eNBs indicated by the DCI format remains constant, wherein at least one of the configurable modification period, a configurable repetition period over which the at least one subframe is provided within the modification period or a subframe offset of the at least one subframe from an initial subframe of the modification period is able to vary between modification periods, and the at least one subframe is dependent on a frame number, a subframe number, a periodicity of the at least one subframe and the subframe offset; and configure the transceiver to transmit at least one of the PDCCH or EPDCCH as indicated by the DTX DCI format, the at least one of the PDCCH or EPDCCH configured to provide a scheduling assignment for the UE.

23. The apparatus of claim 22, wherein:

the first DCI format is periodically transmitted in at least one subframe of the modification period, and the processing circuitry is configured to configure the transceiver to transmit the transmission subframes using higher layer signaling, the higher layer signaling indicating the repetition period and subframe offset within each modification period or a bitmap of subframes within the modification period used for the DTX DCI format transmissions.

24. The apparatus of claim 22, wherein:

the DTX DCI format includes cyclic redundancy code (CRC) bits scrambled by a Discontinuous Transmission Radio Network Temporary Identifier (DTX-RNTI) that specifics indicates use of the DTX DCI format.

25. The apparatus of claim 24, wherein the processing circuitry is configured to:

configure the transceiver to transmit the at least one of the PDCCH and EPDCCH formed in accordance with the DTX DCI format on one of:

a common search space (CSS) on the serving cell, or a UE-group-common search space on the eNB associated with the DTX-RNTI.

26. The apparatus of claim 22, wherein:

the DTX DCI format comprises a sufficient number of padding bits such that the DTX DCI format is a same size as DCI format 1C or DCI format 0.

* * * * *